US012322749B1

(12) United States Patent
Altaras et al.

(10) Patent No.: US 12,322,749 B1
(45) Date of Patent: Jun. 3, 2025

(54) BATTERY COVER REMOVAL AND REASSEMBLY TOOL

(71) Applicants: Eli Altaras, Newport Beach, CA (US); Yusuf Altaras, Newport Beach, CA (US)

(72) Inventors: Eli Altaras, Newport Beach, CA (US); Yusuf Altaras, Newport Beach, CA (US)

(*) Notice: Subject to any disclaimer, the term of this patent is extended or adjusted under 35 U.S.C. 154(b) by 0 days.

(21) Appl. No.: 18/988,865

(22) Filed: Dec. 19, 2024

(51) Int. Cl.
*H01M 10/04* (2006.01)

(52) U.S. Cl.
CPC .................. *H01M 10/0404* (2013.01)

(58) Field of Classification Search
CPC .................. H01M 10/0404; H01M 10/058
See application file for complete search history.

(56) References Cited

U.S. PATENT DOCUMENTS 1,086,391 A * 2/1914 Molyeux ............... B43M 5/04
 53/284.3
4,932,701 A * 6/1990 Cornillier ............ B65G 49/061
 294/187

FOREIGN PATENT DOCUMENTS

DE 202011102761 U1 * 11/2011 ............. F16B 47/00

OTHER PUBLICATIONS

DE 202011102761 English Translation (Year: 2020).*

* cited by examiner

*Primary Examiner* — Jimmy Vo
(74) *Attorney, Agent, or Firm* — Edmond DeFrank (57) ABSTRACT

The embodiments disclose an apparatus including an apparatus for removing and reassembling two-part battery compartments. The apparatus includes a first and second tool, each having a suction cup configured to create a vacuum seal when pressed against a surface suitable for vacuum sealing and an integrated handle for applying torque through opposite rotational movement. The handles allow controlled force to securely separate or reassemble the two components. Each suction cup also includes a vacuum release stem for quick detachment after use. The invention is particularly effective for addressing the common issue of stuck or hard-to-open battery covers, minimizing user effort, slippage, and component damage.

20 Claims, 7 Drawing Sheets

BATTERY COVER REMOVAL AND REASSEMBLY TOOL

BACKGROUND

Many current electronic devices use two-part twist-lock battery compartments. While this design ensures a secure fit, it creates significant challenges when users attempt to remove or replace the battery. Components are often tightly fitted, stuck, or hard to open over time, requiring manual twisting force that can lead to slippage, damage, or frustration.

The lack of a user-friendly method to separate these parts highlights the need for a tool that securely grips the components, applies controlled torque, and ensures safe and easy removal, even when parts are stuck or hard to open. The invention is designed to work on surfaces suitable for vacuum sealing, enabling effective operation across a range of component surfaces.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

It should be noted that the descriptions that follow, for example, in terms of a pair of battery cover removal and reassembly tools is described for illustrative purposes and the underlying system can apply to any number and multiple types of removal and reassembly tools. In one embodiment of the present invention, the removal and reassembly tools can be configured using one of more suction configurations. The removal and reassembly tools can be configured to include handles of differing shapes and can be configured to include mechanical suction devices using the present invention.

Figure 1:
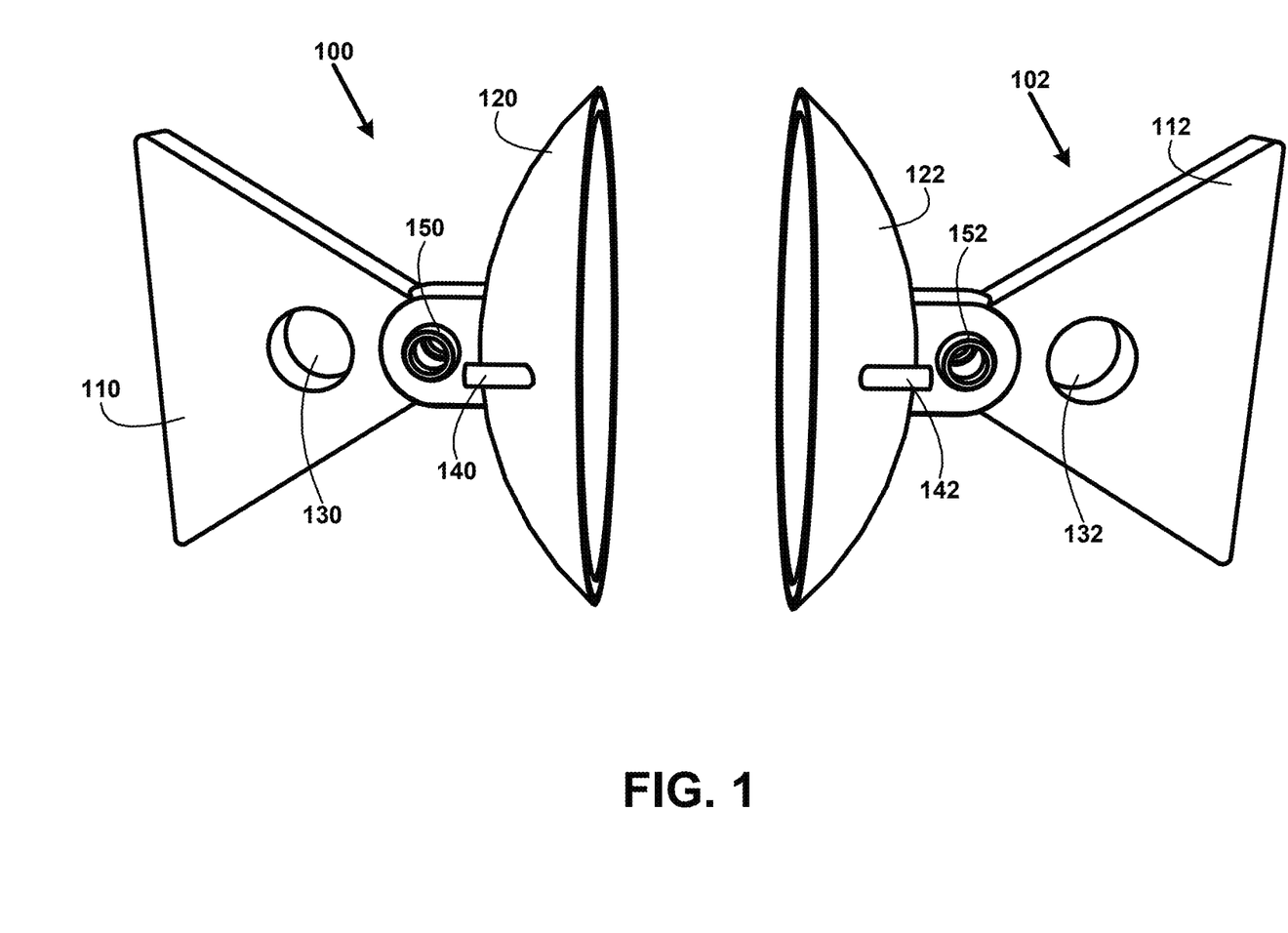
FIG. 1 shows for illustrative purposes only an example of a pair of battery cover removal and reassembly tools of one embodiment.

FIG. 1 shows for illustrative purposes only an example of a pair of battery cover removal and reassembly tools of one embodiment. FIG. 1 shows a left battery cover removal and reassembly tool 100 including a suction cup 120, a twisting precision grip handle 110 with a finger hole 130, a vacuum release stem 140, and handle reinforcement 150. FIG. 1 also shows a right battery cover removal and reassembly tool 102 including a suction cup 122, a twisting precision grip handle 112 with a finger hole 132, a vacuum release stem 142, and handle reinforcement 152.

Each precision grip handle 110 and 112 includes a respective finger hole 130 and 132 for a secure hold by a human hand. The two precision grips with finger holes ensure the user has a secure hold while twisting the battery cover removal and reassembly tools. The left and right battery cover removal and reassembly tool 100 and 102 is made from materials to ensure durability and longevity.

The ergonomically shaped precision grip handles 110 and 112 are reinforced to handle the torque generated during the twisting motion. The handle is contoured to fit comfortably within the user's hand, reducing fatigue during the twisting action use.

Figure 2:
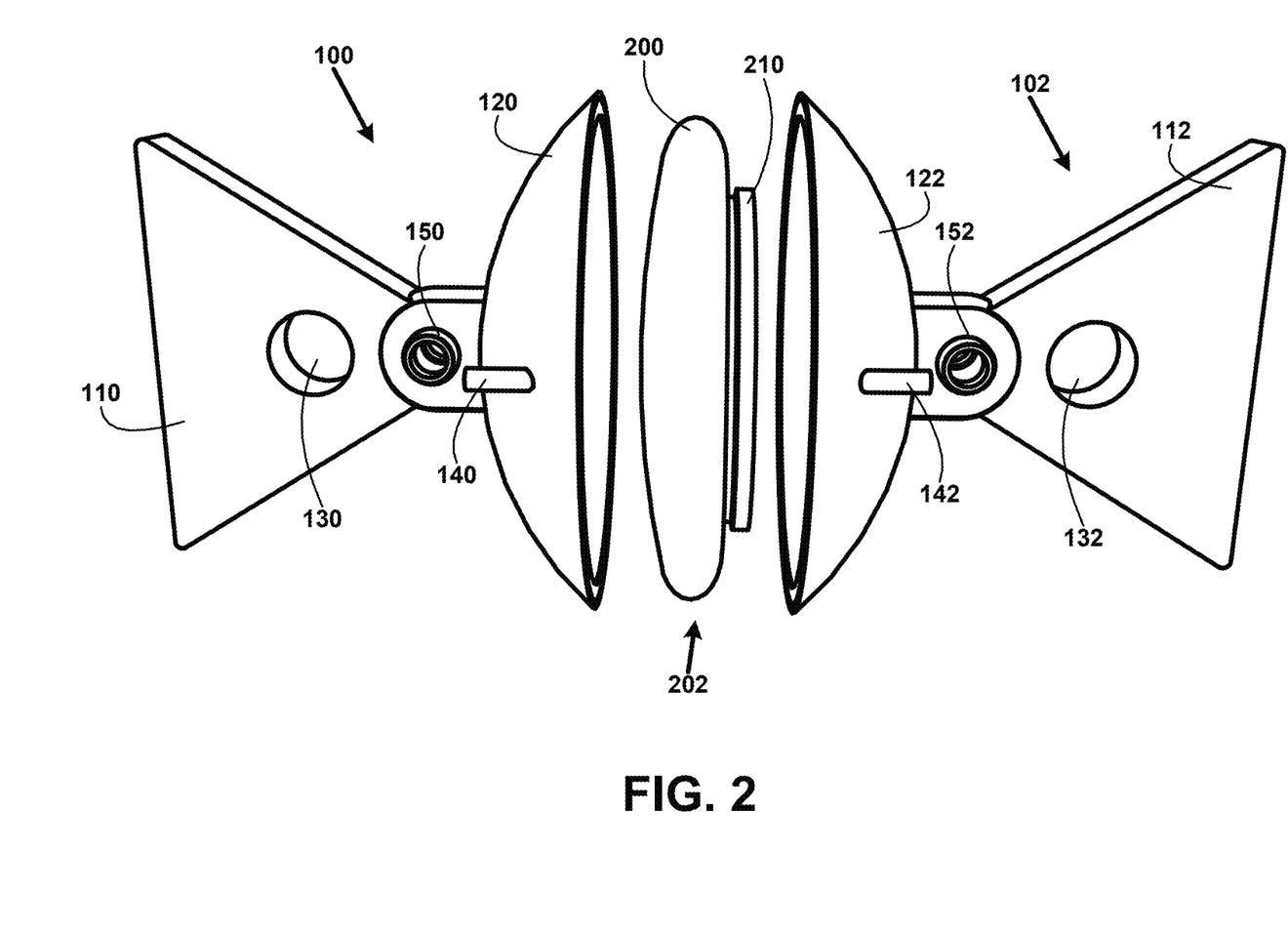
FIG. 2 shows for illustrative purposes only an example of a battery assembly device of one embodiment.

FIG. 2 shows for illustrative purposes only an example of a battery assembly device of one embodiment. FIG. 2 shows a battery assembly 202 having a coin cell battery housing and a twist-lock mechanism to assemble and disassemble the parts to place and replace batteries and secure the battery in the battery assembly 202. The battery assembly 202 is the joining two parts including a removable battery compartment 200 to house the battery secured by a twist-lock locking mechanism 210. Each suction cup when pressed against the battery locking mechanism 210 and removable battery compartment 200 creates surface area equal to or greater than the size of the battery components to increase the twisting torque.

The handles are configured to allow opposite rotational movement, generating the torque necessary to separate or reassemble the two components. The rotational force is effectively transmitted to the suction cups (e.g., suction cup 120), ensuring secure grip and equal pressure on the components. Types of devices and uses for coin cell battery include personal tracking devices, for example, location trackers, wearables including fitness and health devices and smart rings, remote controls, including car key fobs, tv and device remotes, for example, remote control devices, medical devices including hearing aids, glucose meters and thermometers, toys and gadgets including small electronic toys, novelty gadgets, for example, led keychains, calculators, and even some led flashlights, consumer electronics including clocks and camera accessories, and security systems, for example, smoke detectors, motion sensors, and door/window contact sensors in home security systems.

The removable battery compartment 200 serves as the counterpart to the locking mechanism 210, typically embedded in the system that requires power. It provides an interface for the locking mechanism 210 to connect and transfer electrical energy. The removable battery compartment 200 may have contacts or terminals that align with the locking mechanism 210 when inserted correctly.

The two battery parts are configured to be attached and detached through a twisting mechanism, where the battery is rotated into place for installation and rotated out for removal. This locking and unlocking mechanism ensures a secure connection for reliable electrical contact during operation.

The locking and unlocking mechanism ensures a secure connection for reliable electrical contact during operation.

The lower part shown in the bottom view is the locking mechanism 210. The battery is joined with the removable battery compartment 200 with a twisting action to draw the battery into the removable compartment 200.

Figure 3:
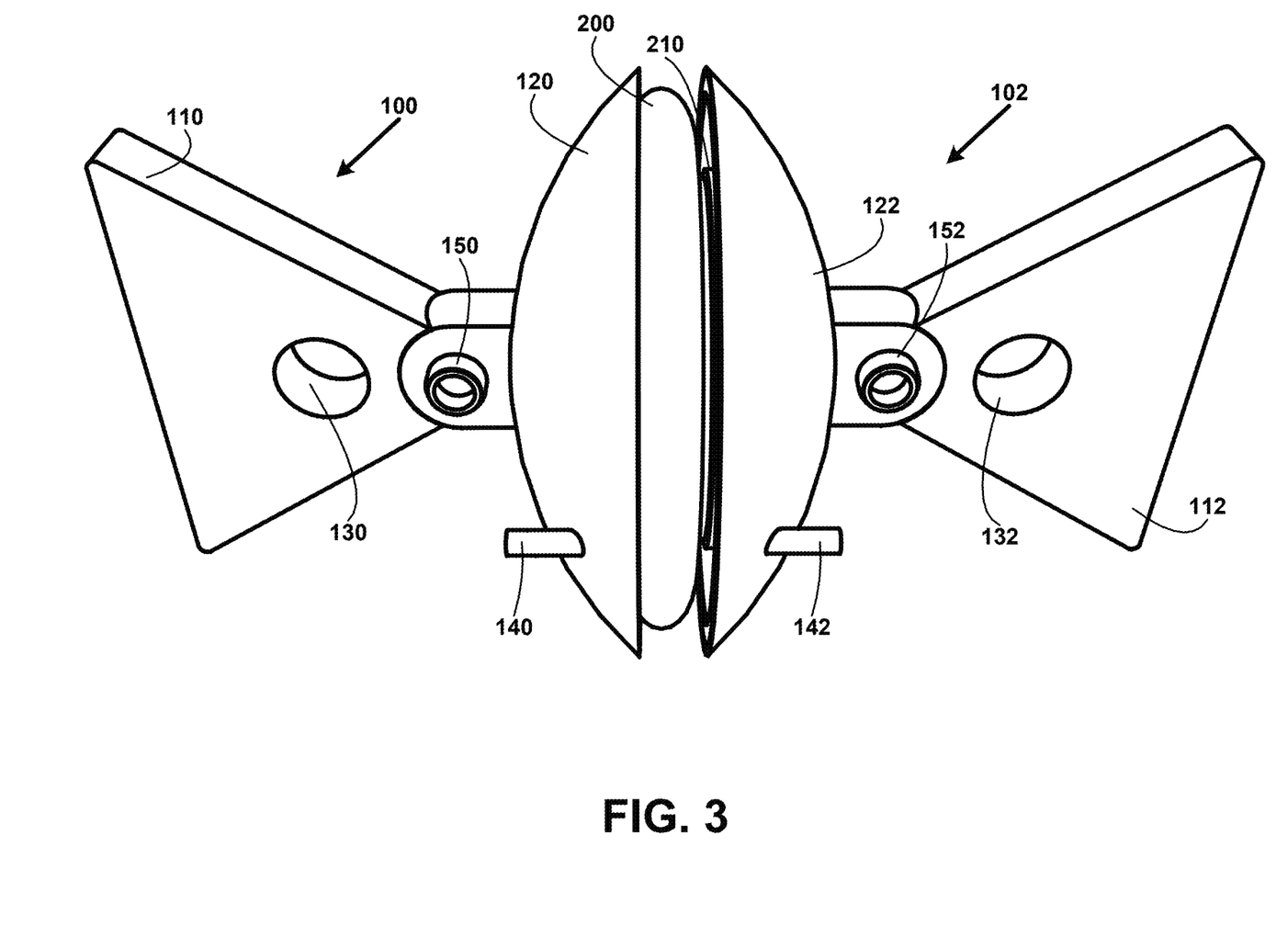
FIG. 3 shows for illustrative purposes only an example of a pair of battery cover removal and reassembly tools positioned for attachment of one embodiment.

FIG. 3 shows for illustrative purposes only an example of a pair of battery cover removal and reassembly tools positioned for attachment of one embodiment. FIG. 3 shows the battery assembly 202 between the left and right battery cover removal and reassembly tools 100 and 102. For example, the left battery cover removal and reassembly tool 100 is positioned to contact the removable battery compartment 200. The right battery cover removal and reassembly tool 102 is positioned to contact the locking mechanism 210. The user positions the suction cup 120 on the surface of removable battery compartment 200 and locking mechanism 210 and applies pressure.

Figure 4:
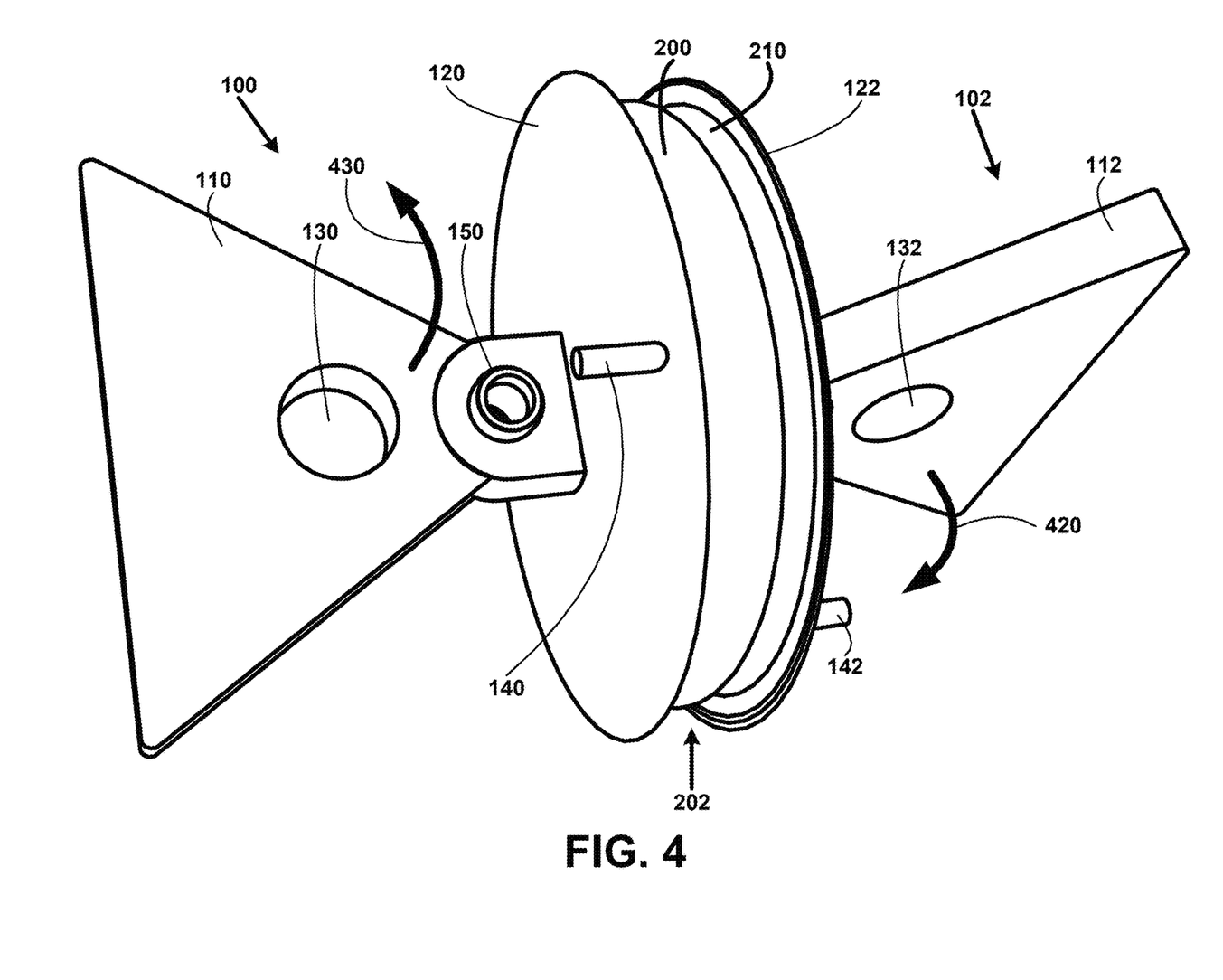
FIG. 4 shows for illustrative purposes only an example of suction cup vacuum forming of one embodiment

FIG. 4 shows for illustrative purposes only an example of suction cup vacuum forming of one embodiment. FIG. 4 shows the surface area of the suction cups expands with the pressure against the surfaces suitable for vacuum sealing. Pressing the suction cup 120 and 122 against the surfaces suitable for vacuum sealing forces air out of the cupped area that then creates a vacuum. A secure attachment created with the suction cups provide a strong vacuum grip on both the removable battery compartment 200 and locking mechanism 210 preventing slippage or accidental detachment during the twisting motion. An ease of manipulation is achieved with the precision handles 110 on the suction cups 120 and 122, allowing the user to easily twist and maneuver both the removable battery compartment 200 and locking mechanism 210, ensuring correct alignment during installation and removal.

The suction cup 120 is made from flexible, high-strength elastomeric material, such as silicone rubber or thermoplastic elastomers, which provides excellent sealing properties and durability. This design simplifies the removal of tightly fitted, stuck, or hard-to-open components while functioning effectively on surfaces suitable for vacuum sealing. The suction cup 120 creates a vacuum chamber. The internal cavity of the suction cup 120 that is responsible for creating the vacuum. This chamber is evacuated creating negative pressure that holds the cup in place. Another component is a release stem. Each suction cup 120 is equipped with a release stem to quickly and safely release the vacuum when the user wishes to detach the suction cup 120 from the removable battery compartment 200 and locking mechanism 210.

Figure 5:
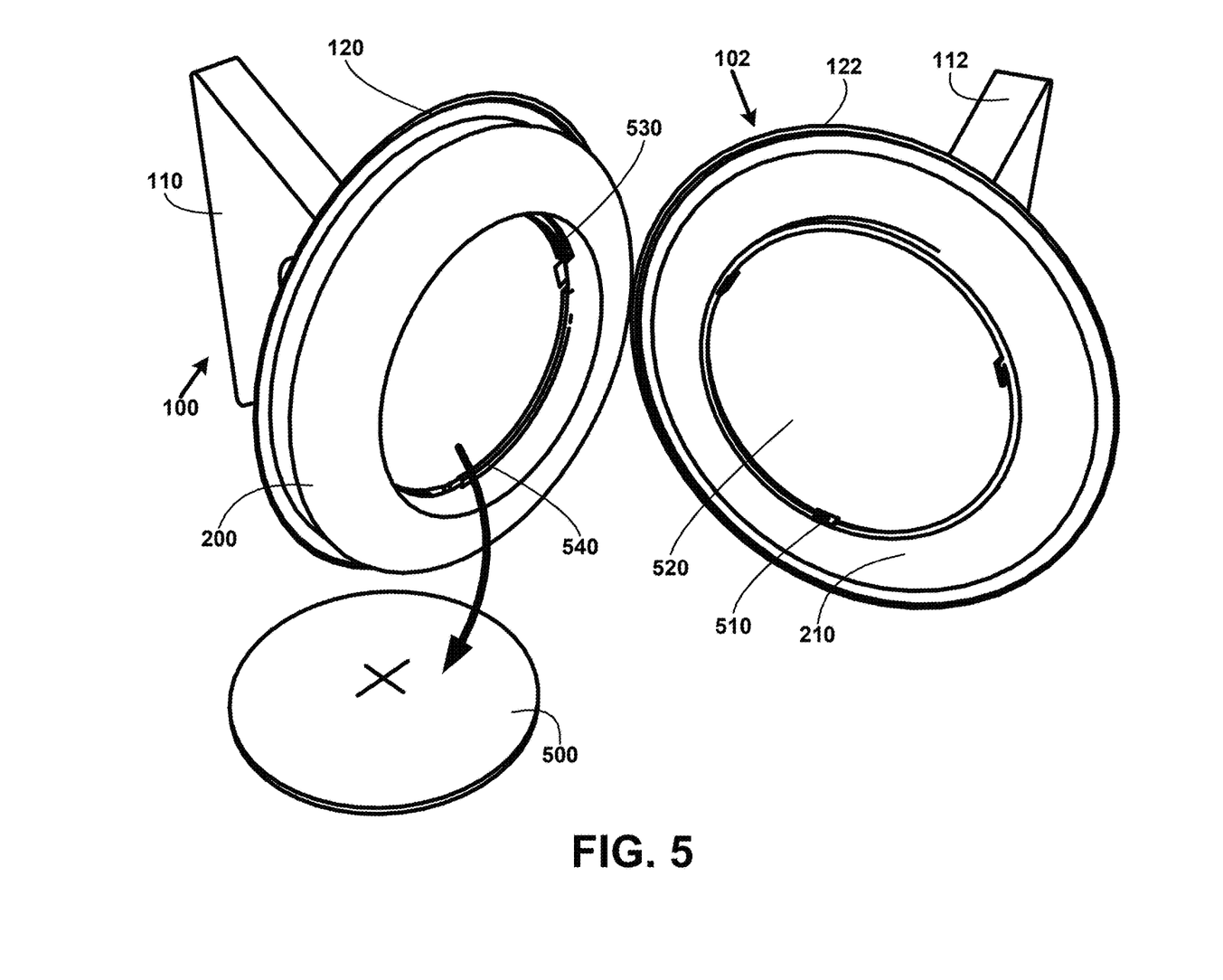
FIG. 5 shows for illustrative purposes only an example of a pair of battery cover removal and reassembly tools pressed against each of the two-part battery and cover of one embodiment.

FIG. 5 shows for illustrative purposes only an example of a pair of battery cover removal and reassembly tools pressed against each of the two-part battery and cover of one embodiment. FIG. 5 shows a pair of battery cover removal and reassembly tools 100 and 102 to handle a battery system with two primary components, a removable battery compartment 200 and locking mechanism 210. The pair of battery cover removal and reassembly tools 100 and 102 incorporate suction cups 120 and 122 with integrated precision grip handles 110 and 112, configured to facilitate the application, insertion, and removal of the battery from the removable compartment 200. The system leverages vacuum suction for secure attachment to both the removable battery compartment 200 and locking mechanism 210 components, enabling easy twisting motion for battery installation and removal.

The suction cups 120 and 122 system is configured to assist in the physical handling and manipulation of the removable battery compartment 200 and locking mechanism 210 during the installation and removal processes. It provides a stable and secure grip on both components without the need for excessive physical force, reducing the risk of damaging the components, especially when dealing with high-voltage or delicate battery technology. The dual suction cup system serves to create a secure attachment. The suction cups 120 and 122 provide a strong vacuum grip on both the removable battery compartment 200 and the locking mechanism 210, preventing slippage or accidental detachment during the twisting motion of one embodiment.

Each suction cup is equipped with an integrated handles to allow the user to manipulate the suction cups effectively. The handles are ergonomically shaped grips, which can be made from materials such as injection-molded plastic, rubberized coatings for comfort, and reinforced to handle the torque generated during the twisting motion. The handles include an ergonomic grip. The handles are contoured to fit comfortably within the user's hand, reducing fatigue during prolonged use.

The precision grip handle 110 is configured to allow for opposite rotational movement to separate the removable battery compartment 200 and locking mechanism 210. The precision grip handle 110 rotates generating the necessary torque to facilitate the separation or joining of the two components.

The precision grip handle 110 is configured to transmit torque rotational force effectively to the suction cups, ensuring that both cups exert equal pressure and torque on their respective components during operation. The vacuum in each suction cup 120 is created by evacuation of air from the cavity of the cup.

The user positions the suction cup 120 on the surface of the battery components and applies pressure. The sealing edge deforms slightly to create a tight seal. The user checks the attachment to ensure that the suction cups 120 and 122 are firmly adhered to the battery components. The user is then able to manipulate the components using the handles. The suction cup system ensures that both the battery components can be securely held and rotated for proper installation or removal.

To install the coin cell battery 500, the user places the suction cups on both the battery piece and receiver, ensuring that the cups are properly aligned with smooth, surfaces suitable for vacuum sealing on each component. The suction cups are activated by applying vacuum forming pressure, securing both the battery and the receiver to their respective suction cups. The handles are then twisted in opposite directions. This creates the necessary rotational torque to align the battery's terminals with the receiver's connection points. Once the components are aligned, the operator continues twisting to lock the coin cell battery 500 into place, securing it firmly within the receiver.

To remove the coin cell battery 500, the suction cups are applied in the same manner, ensuring the vacuum seals are intact on both the battery components. The user twists the handles in opposite directions, generating torque that loosens the coin cell battery 500 from its receiver. Once the components are separated sufficiently, the vacuum pressure is released, and the suction cups can be removed from the battery components of one embodiment.

The locking system is a twist-to-lock mechanism that includes tabs 510 with hooks to lock into rails 540 on the removable battery compartment 200. On the interior of the locking mechanism 210 is a resilient pressure plate 520 that contacts the removed coin cell battery 500 when in the installed location in the removable battery compartment 200 to contact conductive connectors. The rail 540 includes an inverse hook to receive the tab 510 hook. The removable battery compartment 200 includes a rail 540 wherein the three-section rail 540 includes slots 530 between sections to allow the tabs 510 to be pressed in to twist hooks on the tabs 510 to disengage from rail hooks when twisted. The locking mechanism 210 is pressed into the slots 530 to allow the tab 510 hook to align with the rail 540 inverse hook and when twisted disengages the two hooks to remove the locking mechanism 210 from the removable battery compartment 200 to remove the coin cell battery 500.

Figure 6:
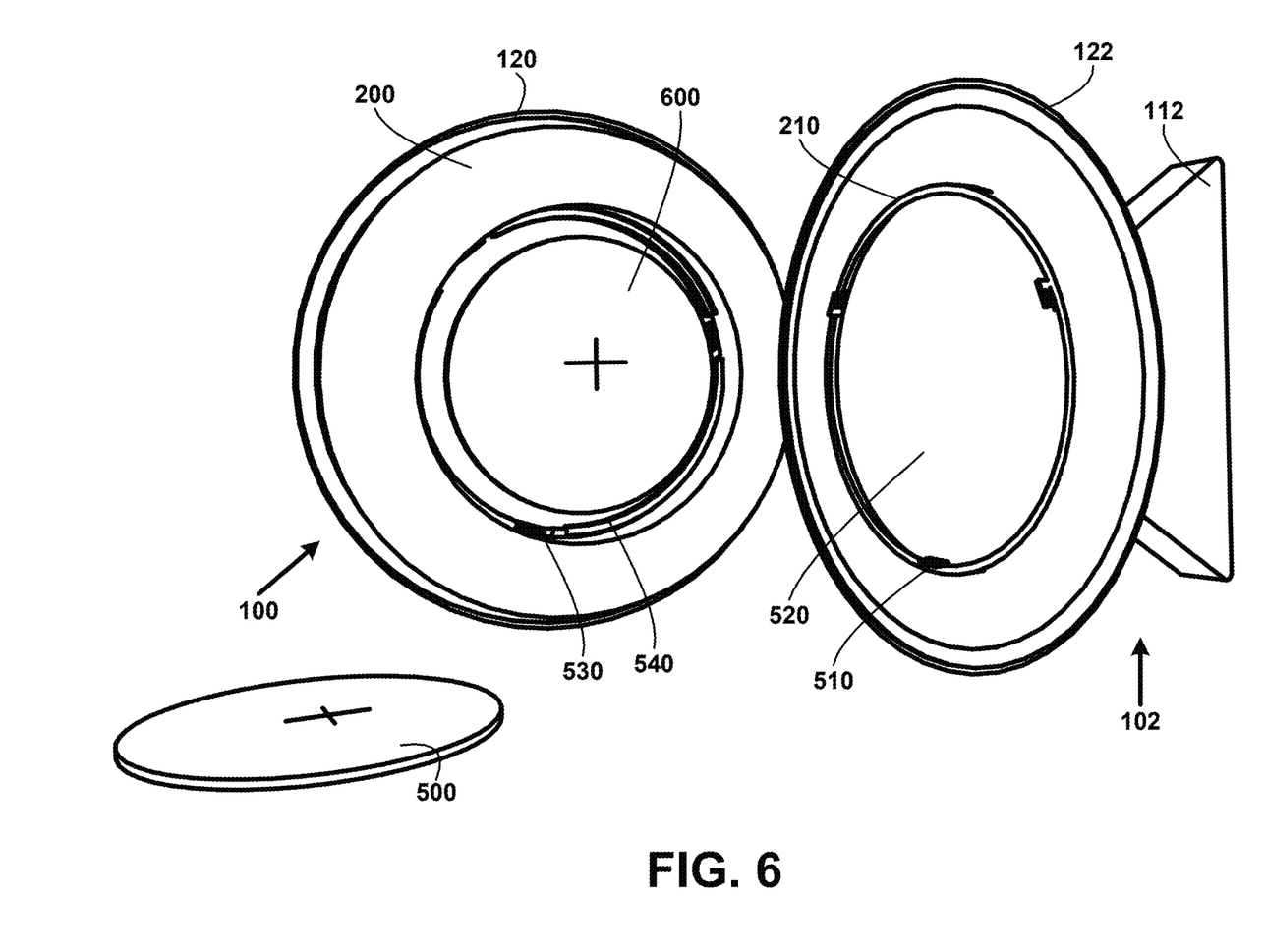
FIG. 6 shows for illustrative purposes only an example of the two-part battery and cover separated after twisting the battery cover removal and reassembly tools of one embodiment.

FIG. 6 shows for illustrative purposes only an example of the two-part battery and cover separated after twisting the battery cover removal and reassembly tools of one embodiment. FIG. 6 shows the pair of the battery cover removal and reassembly tool 100 and 102 while the suction cup 120 is still holding the removable battery compartment 200 and locking mechanism 210. The removable battery compartment 200 and locking mechanism 210 can be positioned for a safe location to release the vacuum and suction cups hold on the parts. The right precision grip handle 112 is visible while the left precision grip handle 110 of FIG. 1 out of view. The battery cover removal and reassembly tool 100 is also used to insert a removable battery compartment 200 and locking mechanism 210 by attaching the suction cups 120 and 122 to a removable battery compartment 200 and locking mechanism 210 pressing the suction cups 120 and 122 to create a vacuum and twist the opposite way to securely close the connect the removable battery compartment 200 and locking mechanism 210 of one embodiment.

The removable battery compartment 200 holds the coin cell battery securely in place. The locking system is a twist-to-lock mechanism that includes tabs 510 with hooks to lock into rails 540 on the removable battery compartment 200. On the interior of the locking mechanism 210 is a resilient pressure plate 520 that contacts the replacement coin cell battery 600 to meet the conductive connectors. The removable battery compartment 200 includes a rail 540 wherein the three-section rail 540 includes slots 530 between sections to accept the tabs 510. The rails 540 includes an inverse hook to receive the tab 510 hook. The locking mechanism 210 is pressed into the slots 530 to allow the tab 510 hook to align with the rail 540 inverse hook and when twisted engages the two hooks to secure the connection of the removable battery compartment 200 and locking mechanism 210.

The metal back cover can be twisted in a clockwise direction to lock it into place, which ensures that the coin cell battery 600 is properly seated, and the device functions as intended. To replace the coin cell battery 500, the user must twist the back cover counterclockwise, which releases the locking mechanism. This allows the back cover to be removed, exposing the coin cell battery 500. The coin cell battery 500 can then be easily replaced, and the back cover is twisted back on to lock the new coin cell battery 600 in place.

Figure 7:
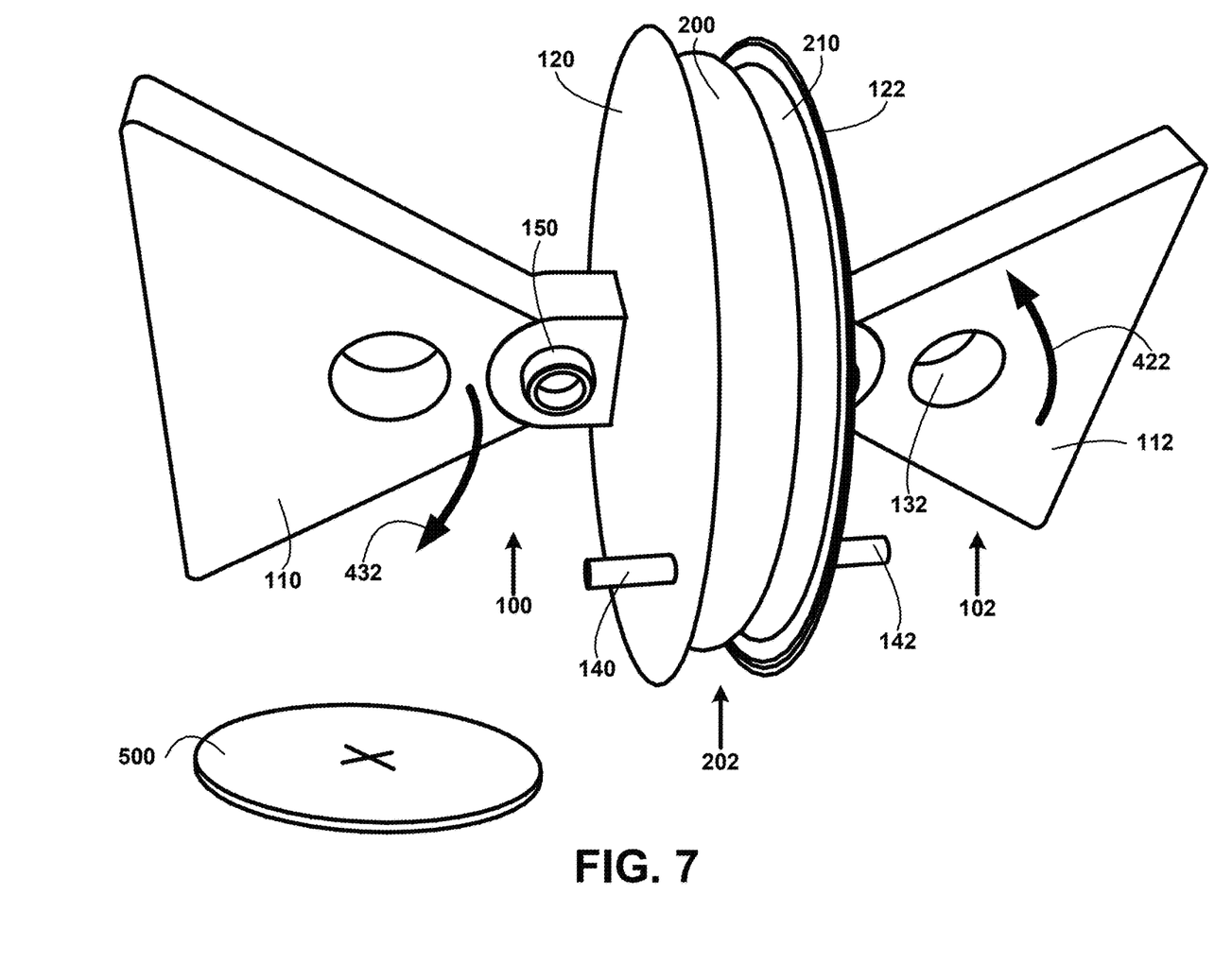
FIG. 7 shows for illustrative purposes only an example of the two-part battery and cover reassembled after retwisting the battery cover removal and reassembly tools of one embodiment.

FIG. 7 shows for illustrative purposes only an example of the two-part battery and cover reassembled after retwisting the battery cover removal and reassembly tools of one embodiment. FIG. 7 shows the pressed suction cup creates a vacuum that is released using a release stem 140 and 142 coupled to the suction cups 120 and 122.

The left battery cover removal and reassembly tool 100 and the right battery cover removal and reassembly tool 102 after replacing the coin cell battery 500 by retwisting in the opposite rotation the removable battery compartment 200 and the locking mechanism 210. The release stems 140 and 142 are near an edge of each suction cup the user pulls to lift the edge to allow air to enter the vacuum. The flow of air into each suction cup relieves the vacuum suction allowing the suction cup to be removed from the respective part it had been attached.

The removed coin cell battery 500 can be disposed of in a proper manner. The battery cover removal and reassembly tools have provided a function to make replacement of the coin cell battery 500 more convenient for the user of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A tool for removing and reattaching a battery cover of a device, comprising:
   a first suction cup configured to adhere to an exterior surface of the battery cover;
   a second suction cup configured to adhere to an opposing surface of the device body;
   wherein the first and second suction cups are separate and unconnected structures, disposed on opposite sides of the device;
   a handle integrated into each suction cup to apply a twisting action to create rotational torque to the surfaces suitable for vacuum sealing of parts to separate the first and second surfaces suitable for vacuum sealing parts;
   wherein the tool is configured to allow a user to apply manual counter-rotational torque between the first and second suction cups to disengage or reattach the cover;
   wherein each suction cup is further configured to press individually against the separated first and second surfaces suitable for vacuum sealing parts to create a vacuum to create rotational torque to reassemble the first and second surfaces suitable for vacuum sealing parts; and
   wherein each suction cup includes a vacuum release tab configured to allow the user to manually release the vacuum seal without deforming the suction cup body or structure.

2. The tool for removing and reattaching a battery cover of a device of claim 1, wherein the first and second battery cover removal and reassembly tools are made from flexible, high-strength elastomeric material such as silicone rubber or thermoplastic elastomers.

3. The tool for removing and reattaching a battery cover of a device of claim 1, wherein the handles are ergonomically shaped grips, which can be made from materials such as injection-molded plastic, and rubberized coatings for comfort, and reinforced to handle the torque generated during the twisting motion.

4. The tool for removing and reattaching a battery cover of a device of claim 1, wherein the handles are reinforced to handle the torque generated during the twisting motion.

5. The tool for removing and reattaching a battery cover of a device of claim 1, wherein the suction cup when pressed against the surfaces suitable for vacuum sealing creates a surface area greater than the surface area of the surfaces suitable for vacuum sealing of parts to increase the twisting torque.

6. The tool for removing and reattaching a battery cover of a device of claim 1, wherein twisting the handles in opposite directions generates rotational torque.

7. The tool for removing and reattaching a battery cover of a device of claim 1, wherein the first and second battery cover removal tools are twisted clockwise to separate the surfaces suitable for vacuum sealing and counterclockwise to reassemble them.

8. A tool for removing and reattaching a battery cover of a device, comprising:
- a first suction cup configured to adhere to an exterior surface of the battery cover;
- a second suction cup configured to adhere to an opposing surface of the device body;
- wherein the first and second suction cups are separate and unconnected structures, disposed on opposite sides of the device;
- a handle integrated into each suction cup to apply a twisting action to create rotational torque to the surfaces suitable for vacuum sealing of parts to separate the first and second surfaces suitable for vacuum sealing parts;
- wherein the tool is configured to allow a user to apply manual counter-rotational torque between the first and second suction cups to disengage or reattach the cover;
- wherein each suction cup is further configured to press individually against the separated first and second surfaces suitable for vacuum sealing parts to create a vacuum to create rotational torque to reassemble the first and second surfaces suitable for vacuum sealing parts; and
- wherein each suction cup includes a vacuum release tab configured to allow the user to manually release the vacuum seal without deforming the suction cup body or structure.

9. The tool for removing and reattaching a battery cover of a device of claim 8, wherein the first and second battery cover removal and reassembly tools are made from flexible, high-strength elastomeric material such as silicone rubber or thermoplastic elastomers.

10. The tool for removing and reattaching a battery cover of a device of claim 8, wherein the handles are ergonomically shaped grips, which can be made from materials such as injection-molded plastic, and rubberized coatings for comfort, and reinforced to handle the torque generated during the twisting motion.

11. The tool for removing and reattaching a battery cover of a device of claim 8, wherein the handles are reinforced to handle the torque generated during the twisting motion.

12. The tool for removing and reattaching a battery cover of a device of claim 8, wherein the suction cup when pressed against the surfaces suitable for vacuum sealing creates a surface area greater than the surface area of the surfaces suitable for vacuum sealing of parts to increase the twisting torque.

13. The tool for removing and reattaching a battery cover of a device of claim 8, wherein twisting the handles in opposite directions generates rotational torque.

14. The tool for removing and reattaching a battery cover of a device of claim 8, wherein the first and second battery cover removal tools are twisted clockwise to separate the surfaces suitable for vacuum sealing and counterclockwise to reassemble them.

15. A tool for removing and reattaching a battery cover of a device, comprising:
- a first suction cup configured to adhere to an exterior surface of the battery cover;
- a second suction cup configured to adhere to an opposing surface of the device body;
- wherein the first and second suction cups are separate and unconnected structures, disposed on opposite sides of the device;
- a handle integrated into each suction cup to apply a twisting action to create rotational torque to the surfaces suitable for vacuum sealing of parts to separate the first and second surfaces suitable for vacuum sealing parts;
- wherein the tool is configured to allow a user to apply manual counter-rotational torque between the first and second suction cups to disengage or reattach the cover;
- wherein each suction cup is further configured to press individually against the separated first and second surfaces suitable for vacuum sealing parts to create a vacuum to create rotational torque to reassemble the first and second surfaces suitable for vacuum sealing parts; and
- wherein each suction cup includes a vacuum release tab configured to allow the user to manually release the vacuum seal without deforming the suction cup body or structure.

16. The tool for removing and reattaching a battery cover of a device of claim 15, wherein the first and second battery cover removal and reassembly tools are made from flexible, high-strength elastomeric material such as silicone rubber or thermoplastic elastomers.

17. The tool for removing and reattaching a battery cover of a device of claim 15, wherein the handles are ergonomically shaped grips, which can be made from materials such as injection-molded plastic, and rubberized coatings for comfort, and reinforced to handle the torque generated during the twisting motion.

18. The tool for removing and reattaching a battery cover of a device of claim 15, wherein the handles are reinforced to handle the torque generated during the twisting motion.

19. The tool for removing and reattaching a battery cover of a device of claim 15, wherein the suction cup when pressed against the surfaces suitable for vacuum sealing creates a surface area greater than the surface area of the surfaces suitable for vacuum sealing of parts to increase the twisting torque.

20. The tool for removing and reattaching a battery cover of a device of claim 15, wherein the first and second battery cover removal tools are twisted clockwise to separate the surfaces suitable for vacuum sealing and counterclockwise to reassemble them.

* * * * *